Sept. 13, 1966 L. B. RUTHAZER 3,273,128

FREQUENCY MULTIPLEXING CIRCUIT

Filed Dec. 31, 1962

INVENTOR.
LEONARD B. RUTHAZER

BY

Fred Jacob

ATTORNEY

United States Patent Office 3,273,128
Patented Sept. 13, 1966

3,273,128
FREQUENCY MULTIPLEXING CIRCUIT

Leonard B. Ruthazer, Norwood, Mass., assignor to Honeywell Inc., a corporation of Delaware Filed Dec. 31, 1962, Ser. No. 248,673
12 Claims. (Cl. 340—172.5)

The present invention relates in general to new and improved data transfer apparatus and in particular to apparatus for transferring digital data signals in a plurality of channels through a single-channel data storage device to a corresponding plurality of utilization devices.

In a high-speed digital data processing system the central processor may supply data output signals to a number of peripheral output devices such as, for example, one or more printers, paper tape punches, magnetic tape drives, etc. Data must be supplied to these peripheral devices at the latter's demand since they are ordinarily incapable of accepting data at the central processor speed. In the past it has been customary to interpose a storage device between the central processor and the peripheral output devices for the purpose of storing the digital data temporarily as it becomes simultaneously available at a plurality of central processor outputs. The data is subsequently fed to the peripheral devices at the demand of the latter. A core matrix or a matrix of flip-flops is conventionally employed in present-day computers, which is capable of accepting the parallel data output signals and storing them. Such a matrix, however, adds materially to the cost of the system.

It is an object of the present invention to effect a saving in cost of temporary storage under the aforesaid conditions by employing a single-channel storage device between a multi-channel data output and the associated utilization devices.

The storage capacity of a single-channel storage device is determined by its length and by the rate at which it can accept data. Thus, a desirable feature of such a storage device for binary digital data applications is the capacity to handle binary digit pulses at a high rate. This rapid data flow makes it possible to multiplex the respective central processor data signals, which are addressed to the different peripheral devices, to the input of the single-channel storage device. Since the data signals appear in pulse form representative of digital data, the storage device must further have a band width sufficiently large to accommodate the frequency range required by the pulse signals.

It is another object of the present invention to provide digital data transfer apparatus wherein a glass delay line which has a high pulse-handling rate and a large band width acts as a single-channel storage device between the plural-channel signal output of a central processor and a corresponding number of associated peripheral devices.

A common technique for transferring a plurality of signals through a single-channel storage device is time multiplexing (time sharing). This technique is subject to certain limitations, notably the sensitivity of the single-channel storage device to temperature limitations. Another technique for simultaneously transferring a plurality of signals through a single-channel storage device, which is far less sensitive to temperature limitations, calls for frequency multiplexing of the signals. Presently available frequency multiplexing circuits usually employ a separate oscillator in each signal channel, each oscillator output signal having a distinct high-frequency $f_{h1}, f_{h2} \ldots f_{hx}$ and being directly pulse-modulated by each separate data signal. The envelope of the frequency spread in each channel about the oscillator frequency $f_h$ is then $$\frac{\sin \pi f/fc}{f/fc}$$

where $f_c$ equals the clock frequency of the data signal, and $f$ equals all frequencies from 0 to infinity.

If the respective oscillator frequencies $f_{h1}, f_{h2} \ldots f_{hx}$ are spread over a sufficiently large frequency spectrum, no bandpass filtering is necessary before the signals are coupled to the joint input. However, when an appreciable number of signals are multiplexed, the band width of any subsequently connected equipment, under these conditions, will generally be insufficient to accommodate the required frequency spectrum. The situation is aggravated where the modulating data signals are in pulse form. Thus a bandpass filter is usually required following the modulator in each channel to absorb all frequencies outside the range $f_h \pm 2f_c$ and as a consequence the cost of the circuit is increased considerably.

It is a further object of the present invention to provide apparatus for frequency-multiplexing signals which operates in a limited band width, without the use of bandpass filters.

Any expansion of the above-described prior art frequency multiplexing equipment requires an additional modulator for each added signal channel, as well as an aditional bandpass filter. Each such expansion, therefore entails considerable expense.

It is still another object of the present invention to provide a signal-multiplexing system which can be economically expanded.

The foregoing objects are attained in the present invention by multiplexing a plurality of signal data channels to the input of a glass delay line. A low-frequency clock signal is provided which has the same frequency as the data clock frequency and is mixed, in each channel, with a different high-frequency carrier signal. A 100% cosinusoidal amplitude-modulated signal is formed which is then gated with the corresponding digital data signal. The envelope of the frequency spread, about $f_h$ in each channel, is then $$\frac{\sin \pi f/fc}{f/fc[1-(f/fc)^2]}$$

This function is such that the energy is concentrated about $f_h$ with almost no energy beyond $f_h \pm 1.75\ f_c$. The output of the respective gating means are jointly buffered to the delay line. At the output of the delay line the data is recovered by means of suitable filtering and detecting means, each tuned to the frequency of the carrier signal of one of the input channels. It is then reshaped and re-clocked before being coupled to the utilization devices.

These and other novel features of the invention, together with further objects and advantages thereof, will become apparent from the following detailed specification with reference to the accompanying drawings in which.

Figures 1, 2:
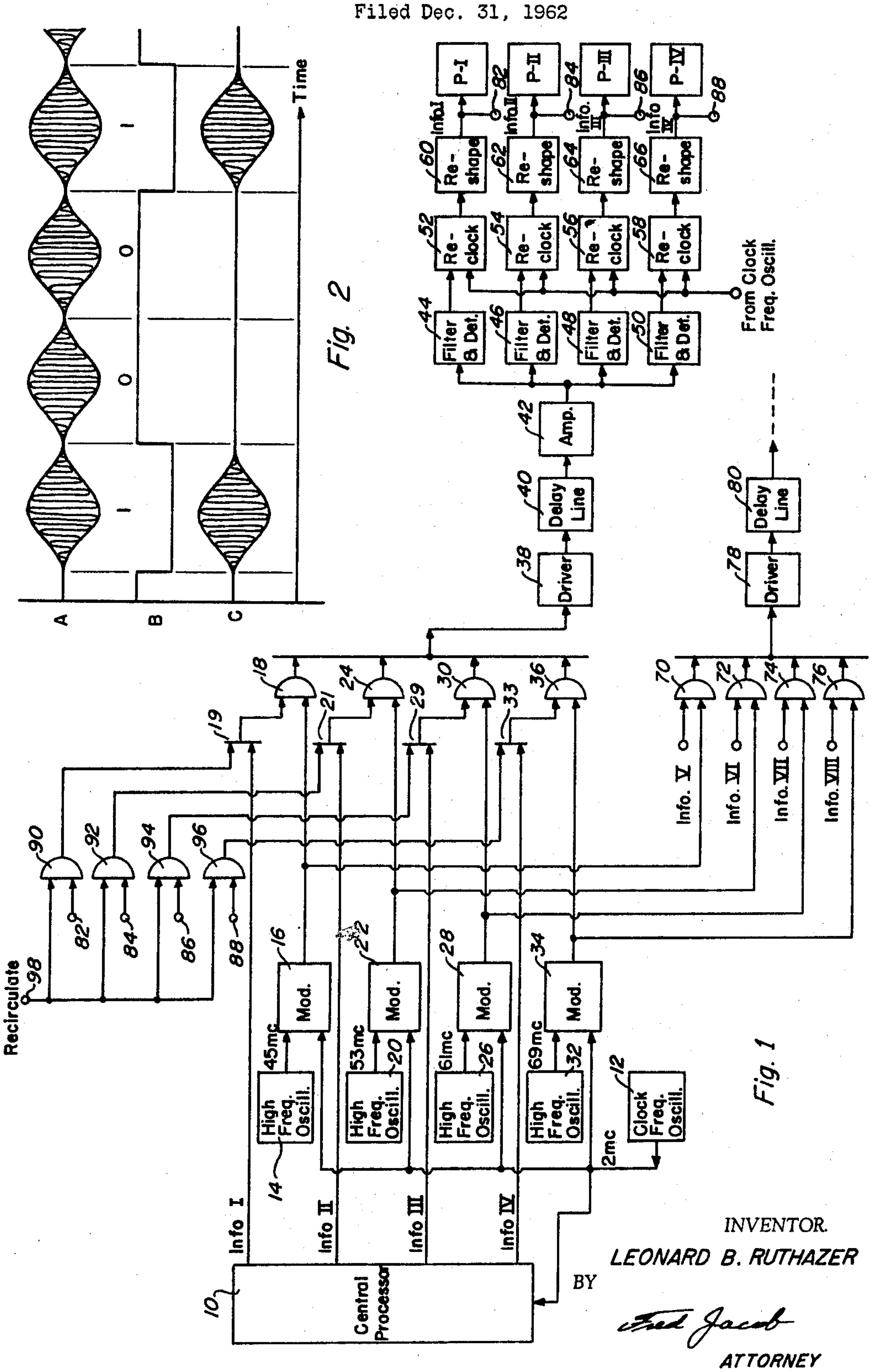
FIGURE 1 illustrates a preferred embodiment of the present invention.
FIGURE 2 illustrates certain waveforms pertinent to the operation of the apparatus of FIGURE 1.

With reference now to FIGURE 1, the invention is illustrated with respect to a four-channel system. The data signals are derived from a central processor 10 and are labeled Info I–Info IV in accordance with their respective channels. A clock frequency oscillator 12 is connected to the aforesaid central processor 10 so that the respective data signals derived from the latter are read out in synchronism.

The first channel comprises a high-frequency oscillator 14 the output of which is connected to a modulator 16, which may be of any of several different kinds well-known in the art. The output of the clock frequency oscillator 12 is similarly connected to the input of the modulator 16. The modulator output is connected to one input leg of a gate 18, the other input leg of which receives the data signal Info I by way of a buffer 19. The term gate, as used herein, denotes a circuit for performing a logical AND function, and the term buffer denotes a circuit for performing a logical OR function.

The remaining channels are substantially identical to the first channel. Thus, the second channel includes a high-frequency oscillator 20 the output of which is connected to a modulator 22 together with the output of which is connected to a modulator 22 together with the output of the clock frequency oscillator 12. A gate 24 has one input leg connected to the output of the modulator 22, the other input leg being connected to the central processor by way of a buffer 21 to receive the data signal Info II. In similar manner, the high-frequency oscillator 26 in the third channel is connected to a modulator 28 together with the clock frequency oscillator. The output signal of the modulator 28 and the data signal Info III are jointly coupled to a gate 30, the latter data signal being obtained from the central processor by way of a buffer 29. In the fourth channel a high-frequency oscillator 32 is connected to a modulator 34 together with the output of the clock frequency oscillator 12. A gate 36 receives the output of the modulator 34 as one of its inputs and the data signal Info IV, by way of a buffer 33, as the other input.

The outputs of the gates 18, 24, 30 and 36 are jointly buffered to a wide-band linear driver amplifier 38 whose output is connected to the input of a single-channel storage device 40. In a preferred embodiment of the invention the latter constitutes a glass delay line having a relatively wide band width. The delay line output is connected to a wide band amplifier 42 whose output, in turn, is coupled to a set of filtering detecting units 44, 46, 48 and 50 respectively, each corresponding to one channel. The output of the last-recited units is coupled to a set of corresponding re-clocking units 52, 54, 56 and 58, respectively, the input of each of which is further connected to the clock signal oscillator 12. The re-clocking units may be of a kind which is well-known in the art, e.g., a circuit using a pair of flip-flops to synchronize slightly asynchronous data. The outputs of the re-clocking units are connected to reshaping units 60, 62, 64 and 66 respectively, similarly well known, the outputs of which are, in turn, coupled to a set of corresponding peripheral devices P–I, P–II, P–III and P–IV.

FIGURE 1 further includes an additional delay line 80, substantially identical to the delay line 40, and preceded by a wide band driver amplifier 78. Four additional data signals designated Info V–Info VIII are respectively applied to a set of gates 70, 72, 74 and 76. The output of the modulator 16 is connected to a further input leg of the gate 70. Similarly, the modulators 22, 28 and 34 are connected to separate input legs on the gates 72, 74 and 76 respectively. The outputs of the gates 70, 72, 74 and 76 are jointly buffered to the input of the driver amplifier 78. The output of the delay line 80 may be coupled to a plurality of utilization devices, not shown, corresponding in number to the number of additional data channels.

The outputs of the reshaping circuits 60, 62, 64 and 66 is further connected to a set of output terminals 82, 84, 86 and 88 respectively, which in turn are connected to the inputs of a set of gates 90, 92, 94 and 96 respectively. Each of the aforesaid gates has a further input leg connected to a terminal 98 which is adapted to receive a "recirculate" signal. The outputs of the gates 90, 92, 94 and 96 are coupled to the gates 18, 24, 30 and 36 respectively by way of the buffers 19, 21, 29 and 33 respectively.

For the purpose of illustrating the operation of the present invention, a glass delay line is assumed with a delay interval of 250 microseconds. The band width of the delay line is assumed to be 35 mc., representative of the band width of presently available glass delay lines. Let the clock frequency $f_c$ be 2 mc. and the frequencies $f_n$ of the signals provided by the high-frequency oscillators 14, 20, 26 and 32, be 45 mc., 53 mc., 61 mc. and 69 mc., respectively. The output signal of the high-frequency oscillator in each channel is modulated with the clock frequency oscillator signal. The output signal of the modulator 16 is illustrated in FIGURE 2A. The digital data signals Info I–Info IV appear at the output of the central processor, as determined by the operation of the latter and in synchronism with the clock frequency. A representative binary digital data signal, such as may constitute the signal Info I for example, is illustrated in FIGURE 2B of the drawings. A negative pulse of clock-period duration is seen to represent a binary ONE and the absence of a pulse represents a binary ZERO. When the signals illustrated in FIGURES 2A and 2B are gated together by the gate 18, the resultant output signal appears as shown in FIGURE 2C. Corresponding signals will be derived at the output of the gates 24, 30 and 36 respectively, depending upon the nature of the digital data signal in each channel.

The output signals of the respective gates are jointly buffered to the linear wide band amplifier driver 38, following which they are temporarily stored in the delay line 40 to be subsequently fed to the amplifier 42. Under the assumed operating conditions, the delay line as well as the amplifiers must have a minimum band width of 32 mc. in order to accept the signal pass band. The latter is determined to be 32 mc. by the relationship $$(f_{h4}+2f_c)-(f_{h1}-2f_c)$$

where $f_{h4}$ equals 69 mc., $f_{h1}$ equals 45 mc. and $f_c$ equals 2 mc., The required data handling rate is determined by the 2 mc. clock frequency to be 2 bits/$\mu$sec./channel, or 8 bits/$\mu$sec. for the single-channel equipment. It will be understood, however, that the data handling rate does not determine the maximum signal frequency which can be passed by the delay line and which, in the example under consideration, is 73 mc.

At the output of the amplifier 42, the filtering and detecting units 44, 46, 48 and 50 are tuned respectively to the frequencies of the high-frequency oscillators 14, 20, 26 and 32 in order to recover the data signals from the corresponding channels. The clock frequency oscillator signal is employed in the circuits 52, 54, 56 and 58 respectively to re-clock the data signals, whence they are reshaped in the circuits 60, 62, 64 and 66 respectively. The signals thus obtained correspond to those originally derived at the output of the central processor and are coupled to the corresponding peripheral output devices P–I to P–IV respectively.

The multiplexing portion of the circuit described in the example chosen requires no band pass filter on the input provided a frequency difference of at least four times the clock frequency is maintained between any pair of high-frequency oscillator signals. Smaller separations between carrier frequencies, i.e. between high-frequency oscillator signals, are quite feasible with the present invention. The resultant frequency spectrum can be readily accommodated by the glass delay line which may have a band width of the order of 35 mc. By comparison, prior art circuits are able to avoid the use of band pass filters only if the frequency difference between any pair of carrier frequencies is a much larger multiple of $2f_c$. Under these conditions, a four-channel signal output such as the one described above requires a frequency spectrum greater than the maximum band width of the delay line. As a consequence, band pass filters cannot be dispensed with in such a circuit for any appreciable number of data channels.

The length of the delay line, and hence its data storage capacity, is limited primarily by temperature considerations. Temperature considerations also limit the data handling capacity of the delay line. Glass delay lines having a delay interval as high as 360 microseconds are quite feasible. Let is be assumed that each of the four peripheral devices is a high-speed printer of the kind which prints one line at a time of up to 120 characters per line, so that as many as 480 data characters may temporarily be stored before they are fed to the printer. If each character is represented by six bits, the maximum number of bits which must be stored at any given time by the delay line for the four channels is 2,880. Thus, a 360-microsecond delay line is adequate to meet such a requirement.

As previously pointed out, the peripheral output devices normally operate at a slower rate than the central processor. Under certain conditions, the peripheral devices may not be ready to receive the information coming from the delay line after a single delay interval. The present invention further permits the data to be stored dynamically by recirculation around the delay line. A recirculate signal is applied to the terminal 98 and the data signals derived at the output terminals 82, 84, 86 and 88 are fed back to the inputs of the recirculation gates 90, 92, 94 and 96 respectively, whence they are coupled to the inputs of the gates 18, 24, 30 and 36 respectively. The information in each channel thus recirculates at delay line intervals and is periodically available until accepted by the peripheral units.

The maximum data handling rate and the length of the delay line are both limited by temperature considerations. Where it is necessary to increase the number of data channels beyond the storage capacity of the delay line, the invention may be expanded to include one or more additional delay lines. As compared to prior art devices where an additional band bass filter is required in each data channel when a delay line is added, it is merely necessary to provide additional gating means in the present invention.

FIGURE 1 illustrates a connection for a system of doubled capacity having four additional data channels designated Info V–Info VIII. The output signals of the modulators 16, 22, 28 and 34 respectively are used as carriers to be gated by the data signals Info V–Info VIII respectively. It will be understood that the latter data signals occur at the clock frequency of the oscillator 12. The outputs of the gates 70, 72, 74 and 76 are jointly buffered, by way of the driver 78, to the delay line 80, which temporarily stores the multiplexed information substantially in the same manner as the delay line 40 prior to coupling it to the subsequent utilization devices. If the delay line 80 has a storage capacity and a data handling rate substantially like that of the delay line 40, a doubled storage capacity of the circuit is achieved which requires only one additional gate per channel in addition to the delay line and associated amplifiers.

Although the invention has been illustrated with reference to a four-channel system, it will be understood that it is not so limited. This also applies to the number of illustrated additional data channels and the number of additional delay lines which may be employed. Similarly, the indicated signal frequencies are exemplary only.

It will be apparent from the foregoing disclosure of the invention that numerous modifications, changes and equivalents will now occur to those skilled in the art, all of which fall within the true spirit and scope contemplated by the invention.

What is claimed is:

1. Data transfer apparatus comprising a plurality of data channels, a delay line, means for providing a clock frequency signal, means in each channel for mixing said clock frequency signal with a high-frequency signal unique to said channel to amplitude-modulate the latter signal, means in each channel for gating a separate data signal with the output of said mixing means in synchronism with said clock frequency, means for simultaneously coupling the output of each of said gating means to said delay line, means in each channel coupled to said delay line for recovering an output signal corresponding to the data signal in said channel, and means for coupling each of said output signals to a utilization device.

2. The apparatus of claim 1 and further comprising a recirculation gate corresponding to each of said channels, means in each channel for coupling each of said output signals to its corresponding recirculation gate, means in each channel for buffering the output of said recirculation gate and said data signal to the input of said gating means, and means for selectively activating said recirculation gates.

3. The apparatus of claim 1 and further comprising a plurality of additional data channels each adapted to receive a separate data signal, means in each of said additional data channels for gating the data signal therein with the output of a different one of said mixing means in synchronism with said clock frequency, at least one additional delay line, means for simultaneously coupling the output of each of said last-recited gating means to said additional delay line, and means coupled to said last-recited delay line for recovering the data signals in said additional data channels.

4. Apparatus for transferring data signals from a plurality of channels through a single-channel storage device, comprising means for deriving a clock frequency signal, means in each channel for mixing said clock frequency signal with a high-frequency signal unique to said channel to amplitude, modulate the latter signal, means in each channel for gating the output signal of said mixing means with the data signal in said channel in synchronism with said clock frequency, means for coupling the output of all of said gating means to the input of said single-channel storage device, and signal recovery means coupled to the output of said single-channel storage device for deriving a plurality of separate signals corresponding to respective ones of said data signals.

5. Apparatus for multiplexing a plurality of distinct data signals, comprising means for providing a low-frequency signal, means for providing a separate high-frequency signal corresponding to each of said data signals, means for separately amplitude-modulating each of said high-frequency signals with said low-frequency signal, means operative in synchronism with said low-frequency signal for gating the output signals derived from each of said modulating means with a different one of said data signals, and means for coupling the output of all of said gating means to a common junction point.

6. Multiplexing apparatus, comprising means for providing a substantially cosinusoidal low-frequency signal, a plurality of data signals synchronized to said low-frequency signal, means for providing a corresponding plurality of high-frequency signals, means for separately amplitude-modulating each of said high-frequency signals with said low-frequency signal to provide a corresponding output signal, means for gating said output signals with different ones of said synchronized data signals, and means for coupling the output of each of said gating means to a common junction point.

7. Apparatus for simultaneously transferring a plurality of digital data pulse signals, comprising means for providing a corresponding plurality of distinct high-frequency signals, means for providing a low frequency signal, means for separately amplitude-modulating each of said high-frequency signals with said low-frequency signal, means for gating the signal derived from each of said modulating means with a different one of said data pulse signals in synchronism with said low-frequency signal, means for simultaneously receiving the output of said gating means, and means tuned to respective ones of said high-frequency signals for recovering a plurality of signals corresponding to respective ones of said data pulse signals.

8. Apparatus for transferring digital data pulse signals in a plurality of channels through a single-channel storage device, comprising means for providing a distinct high-frequency signal corresponding to each of said channels, means for providing a low-frequency signal, means in each channel for amplitude-modulating the corresponding high-frequency signal with said low-frequency signal, means in synchronism with said low-frequency signal for gating the output of said modulating means in each channel with the corresponding data pulse signal, means for simultaneously coupling the output of all of said gating means to said single-channel storage device, and means tuned to respective ones of said high-frequency signals for recovering output signals corresponding respectively to said data pulse signals.

9. The apparatus of claim 8 wherein the frequency of said low-frequency signal is $f_c$ and the frequency range of respective ones of said high-frequency signals extends from $f_1$ to $f_2$, drive amplifier means directly connecting the output of said gating means to said single-channel storage device, said storage device having a band width at least equal to $$(f_1-\tfrac{3}{2}f_c) \text{ to } (f_2+\tfrac{3}{2}f_c)$$

10. Data transfer apparatus comprising a clock adapted to provide a substantially cosinusoidal clock signal at a frequency $fc$, a plurality of channels each including a high-frequency oscillator adapted to operate at a distinct frequency in a freuqency range $f_1-f_3$, the difference of the frequencies of any pair of said high-frequency oscillators being at least twice the clock frequency, means in each channel for mixing the output signals of the corresponding high-frequency oscillator and of said clock, means corresponding to respective ones of said channels for simultaneously supplying pulsed digital data signals in synchronism with said clock, means in each channel for gating said data signals with the output of said mixing means, a wide-band signal driver, said gating means being jointly buffered to the input of said driver, a glass delay line connected to the output of said driver, said glass delay line having a band width at least equal to the frequency spectrum $$(f_1-\tfrac{3}{2}f_c) \text{ to } (f_2+\tfrac{3}{2}f_c)$$

means for amplifying the wide-band output signal of said delay line, filtering and detecting means corresponding to each of said output channels and tuned to the frequency of the high-frequency oscillator in the corresponding input channel to recover the data signal in the latter, means in each output channel for re-clocking and reshaping said recovered data signal, and a utilization device connected to said last-recited means in each of said channels.

11. The apparatus of claim 10 and further comprising a recirculation gate for each of said channels, the output of each of said recirculation gates being jointly buffered to said gating means with the corresponding data signal, means for coupling said re-clocked and reshaped data signals to the inputs of said recirculation gates, and means for selectively activating said last-recited gates.

12. The apparatus of claim 10 and further comprising a plurality of additional channels, means corresponding to respective ones of said additional channels for simultaneously providing pulsed data signals in synchronism with said clock, means in each of said additional channels for gating one of said last-recited data signals with the output of one of said mixing means, a glass delay line having input and output circuits, means for jointly buffering the outputs of said last-recited gating means to said input circuit, and means corresponding to each of said additional channels coupled to said output circuit and tuned to the high-frequency signal of the mixer connected to said additional channel for recovering the data signal in said additional channel and coupling it to a utilization device.

References Cited by the Examiner

UNITED STATES PATENTS

| | | | |
|---|---|---|---|
| 2,828,358 | 3/1958 | Ridler | 179—70 |
| 2,831,179 | 4/1958 | Wright et al. | 340—174 |
| 2,840,800 | 6/1958 | Chester | 340—174 |
| 2,933,717 | 4/1960 | Tyas | 340—173 |
| 2,961,535 | 11/1960 | Lanning | 328—55 |

ROBERT C. BAILEY, *Primary Examiner.*

R. M. RICKERT, *Assistant Examiner.*